(12) United States Patent
Lopez Galera et al.

(10) Patent No.: US 10,286,877 B2
(45) Date of Patent: May 14, 2019

(54) SYSTEM AND METHOD FOR CLEANING A VEHICLE-MOUNTED OPTIC LENS

(71) Applicant: FICO TRANSPAR, S.A., Barcelona (ES)

(72) Inventors: Robert Lopez Galera, Barcelona (ES); Carlos Esteller Pitarch, Barcelona (ES); Miguel Mota López, Barcelona (ES)

(73) Assignee: FICO TRANSPAR, S.A., Barcelona (ES)

( * ) Notice: Subject to any disclaimer, the term of this patent is extended or adjusted under 35 U.S.C. 154(b) by 368 days.

(21) Appl. No.: 14/721,331

(22) Filed: May 26, 2015

(65) Prior Publication Data

US 2015/0343999 A1 Dec. 3, 2015

(30) Foreign Application Priority Data

May 27, 2014 (EP) ..................................... 14382188

(51) Int. Cl.
*B60S 1/08* (2006.01)
*B08B 3/02* (2006.01)
(Continued)

(52) U.S. Cl.
CPC .............. *B60S 1/0848* (2013.01); *B08B 3/02* (2013.01); *B60S 1/481* (2013.01); *B60S 1/52* (2013.01);
(Continued)

(58) Field of Classification Search
CPC .......... B60S 1/0848; B60S 1/52; B60S 1/522; B60S 1/524; B60S 1/528; B60S 1/54;
(Continued)

(56) References Cited

U.S. PATENT DOCUMENTS

| 2004/0005230 A1* | 1/2004 | Vockroth | ................ F03C 1/013 417/401 |
| 2004/0084069 A1 | 5/2004 | Woodard | |

(Continued)

FOREIGN PATENT DOCUMENTS

| DE | 10332939 A1 | 2/2005 |
| WO | 2014017015 A1 | 1/2014 |

OTHER PUBLICATIONS

European Search Report for corresponding application EP14382188; Report dated Nov. 6, 2014.

*Primary Examiner* — David G Cormier
(74) *Attorney, Agent, or Firm* — Cantor Colburn LLP

(57) ABSTRACT

The present invention refers a system and a method for automatically cleaning an optic lens mounted on a vehicle, by spraying a washing liquid to remove any type of dirt from the lens such as a clear image or optic signal can be captured anytime, where an air pump is provided including a variable volume compression chamber to pressurize a volume of air, and a washing liquid conduit is communicated with a liquid nozzle and with the air pump, such as the air pump can be operated by the flow of pressurized washing liquid, such as the same flow of pressurized washing liquid is used to clean the optic surface, and to operate the air pump and generate a blast of air to blow off any liquid drop from the optic lens.

17 Claims, 8 Drawing Sheets

(51) Int. Cl.
  *B60S 1/48* (2006.01)
  *B60S 1/52* (2006.01)
  *B60S 1/54* (2006.01)
  *B60S 1/56* (2006.01)

(52) U.S. Cl.
  CPC . *B60S 1/54* (2013.01); *B60S 1/56* (2013.01); *B60S 1/528* (2013.01); *B60S 1/544* (2013.01)

(58) Field of Classification Search
  CPC .. B60S 1/544; B60S 1/546; B60S 1/56; B60S 1/481; B08B 3/02; B08B 5/02; B08B 7/04; B08B 2203/027; B08B 2205/00
  See application file for complete search history.

(56) References Cited

U.S. PATENT DOCUMENTS

| | | | |
|---|---|---|---|
| 2005/0121539 A1* | 6/2005 | Takada | B60S 1/52 239/284.2 |
| 2009/0250533 A1* | 10/2009 | Akiyama | B60S 1/381 239/284.1 |
| 2013/0092758 A1 | 4/2013 | Tanaka | |
| 2017/0182980 A1* | 6/2017 | Davies | B60S 1/56 |
| 2017/0313286 A1 | 11/2017 | Galera et al. | |

* cited by examiner

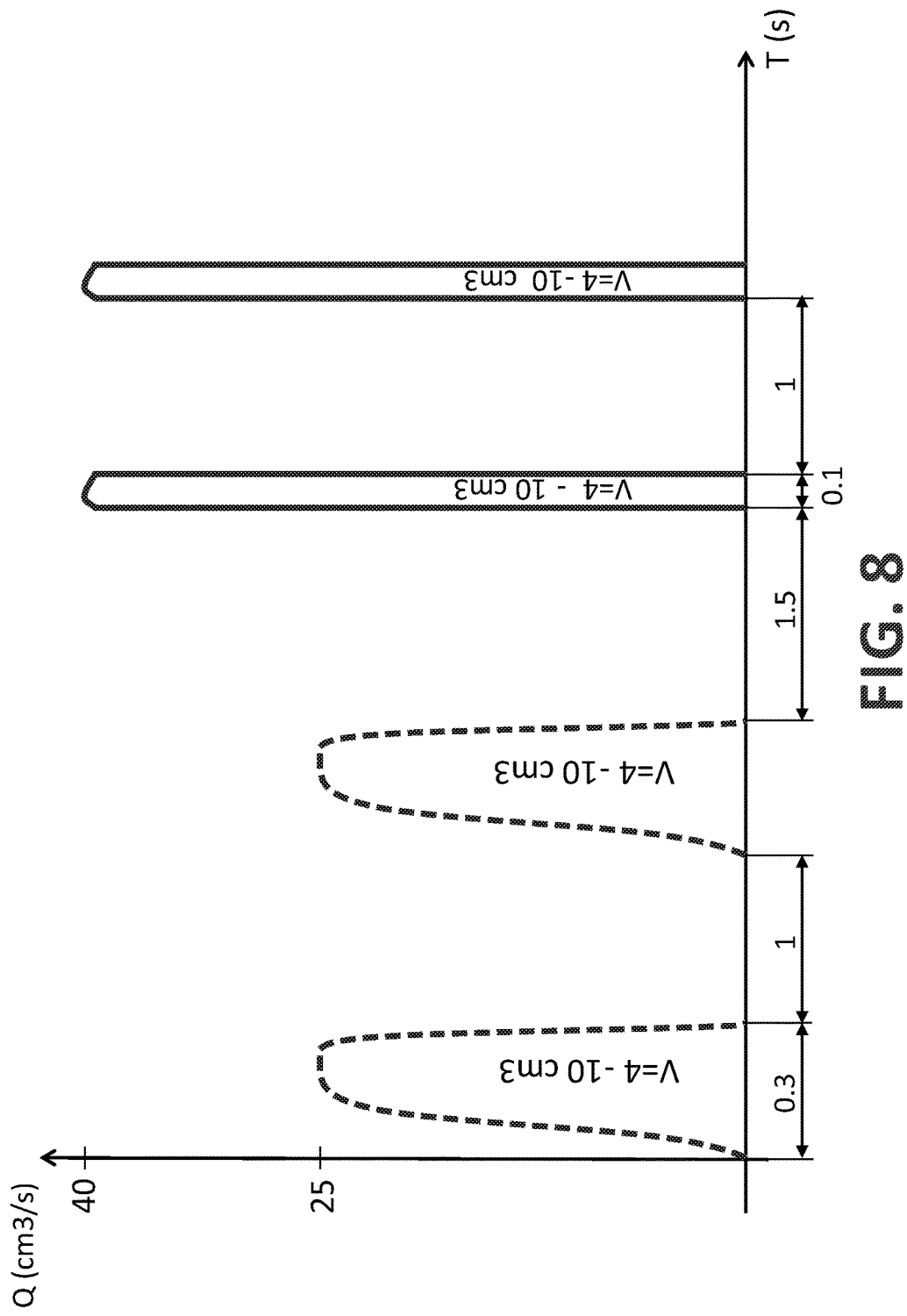

SYSTEM AND METHOD FOR CLEANING A VEHICLE-MOUNTED OPTIC LENS

CROSS REFERENCE TO RELATED APPLICATION

This application is related to and claims the benefit of European Patent Application Number 14382188.2 filed on 27 May 2014, the contents of which are herein incorporated by reference in their entirety.

TECHNICAL FIELD

The present invention refers in general to techniques for automatically cleaning an optic lens mounted on a vehicle, by spraying a washing liquid to remove any type of dirt from the lens, such that a clear image or optic signal can be captured anytime.

More in particular, the invention provides a system and a method for automatically cleaning an optic lens which, in a simple manner and with a reduced cost, is capable of completing the cleaning process quickly and satisfactorily.

The invention is especially advantageous for cleaning vehicle-mounted parking cameras lens or any type of optic sensor lens.

BACKGROUND OF THE INVENTION

At present, motor vehicles are currently fitted with optic sensors to assist drivers in diverse traffic situations, such as, but not limited to, parking assistance, blind zone object detection, traffic lane departure, traffic signal identification or rear view mirror substitution.

Generally, these optic sensors are fitted on a vehicle exterior surface such that a lens surface of the optic sensor is exposed to dirt which deprives the quality of the captured image. This exposure can be direct or indirect, the latter occurring when the lens surface is disposed behind a cover window. Hence, there is a need to remove a foreign matter stuck onto a lens surface or a cover window of a vehicle-mounted optic sensor.

There are various types of camera washing devices to wash a front glass or lens of an in-vehicle mounted camera, and which are conventionally equipped with a high pressure air generation device, which generates high-pressure wash water by using high-pressure air, and sprays the high-pressure wash water on the surface of the cover glass or lens of the in-vehicle camera, in order to wash and clean the surface of the cover glass of the in-vehicle camera.

However, while the wash water is being applied to wash the lens or cover glass and until the water has been fully evaporated, the driver of the vehicle cannot see properly the captured image. To solve this problem, there are known devices which use a blast of air to dry the remaining washing water on the lens or cover glass. However, these devices are usually based in motor driven air pumps, which are complex and expensive equipments.

SUMMARY OF THE INVENTION

The present invention is defined in the attached independent claims and it overcomes the above-mentioned drawbacks of the prior art, by providing a simple cleaning technique which is capable of completing a cleaning process quickly and with a reduced number of components.

An aspect of the invention refers to a system for cleaning an optic surface such as an optic lens or a transparent cover mounted in an external surface of a vehicle, wherein the optic surface can be associated optically with any type of light sensitive device suitable for capturing or sensing an image. Preferably, the light sensitive device is a video camera or an optic sensor.

The system of the invention comprises a washing liquid nozzle to dispense washing liquid on the optic surface, and an air nozzle to project an air flow on that surface after the washing liquid has been dispensed, so as to blow off any drop of washing liquid which may have been formed on the optic surface. Therefore, any drop of washing liquid on the optic surface which may impair capturing a quality image, is quickly removed and the cleaning time is therefore reduced.

In the cleaning system, pressurized washing liquid is fed to the liquid nozzle, and an air pump is provided to generate a jet of pressurized air. The air pump is configured to generate pressurized air, by means of the hydraulic force exerted by a fluid applied to the air pump. Additionally, the same flow of pressurized washing liquid which is supplied to the liquid nozzle is also fed to the air pump, such that the air pump is operated by same washing liquid.

A technical effect and advantage derived from the above-described configuration is that the flow of pressurized washing liquid has a double function, namely to clean the optic surface, and to operate the air pump and generate a blast of air. Therefore, only a liquid pump is necessary to generate both the pressurized washing liquid and the pressurized air, so that that double function is implemented with a reduced number of components, thus, in a very cost-effective manner. In contrast with the prior art, there is no need to provide a motorized equipment specifically for generating the air blast.

The air pump includes a variable volume compression chamber, so that by applying the hydraulic pressure of the washing liquid to it, the volume of that chamber is reduced and the air enclosed therein is pressurized.

Dispensing the washing liquid and the air blow in a coordinated manner is carried out by a control unit operatively associated with an air flow control device and with a liquid flow control device. The control unit is adapted to perform different cleaning cycles. In a preferred cleaning cycle according to the invention, a predetermined amount of pressurized washing liquid is first dispensed onto the optic surface by opening the liquid flow control device for a predetermined period or periods of time, after which the liquid flow control device is closed and the air flow control device is opened such that at least one blast of pressurized air is applied onto the optic surface to blow off any drop of washing liquid from the optic surface.

Another aspect of the invention refers to a method for cleaning a vehicle-mounted optic lens wherein an air pump operable by a flow of pressurized liquid is provided, the air pump including for that purpose a variable volume compression chamber to pressurize a volume of air. A flow of pressurized washing liquid is supplied both to a liquid flow control device, and to the compression chamber to generate a volume of pressurized air. In the method of the invention, a burst of pressurized washing liquid and/or a blast of pressurized air are dispensed in a coordinated manner on the optic lens according to a pre-determined cleaning sequence. Preferably, a pre-determined cleaning sequence according to the invention comprises: first dispensing at least one burst of washing liquid onto the optic lens, and after that, projecting pressurized air onto the optic lens to blow off any drop of washing liquid from the optic lens.

In the present description the term optic surface refers to any type of surface which assists or merely allows an optic device to capture an image. More specifically, an optic surface is an optic lens or a cover window placed to protect an optic lens or to protect an optic sensor.

BRIEF DESCRIPTION OF THE DRAWINGS

Preferred embodiments of the invention are henceforth described with reference to the accompanying drawings, wherein:

FIG. 8.—is a graph representing the measured flow (Q) of washing liquid and air dispensed during the cleaning sequence of FIG. 7.

DETAILED DESCRIPTION

Figure 1:
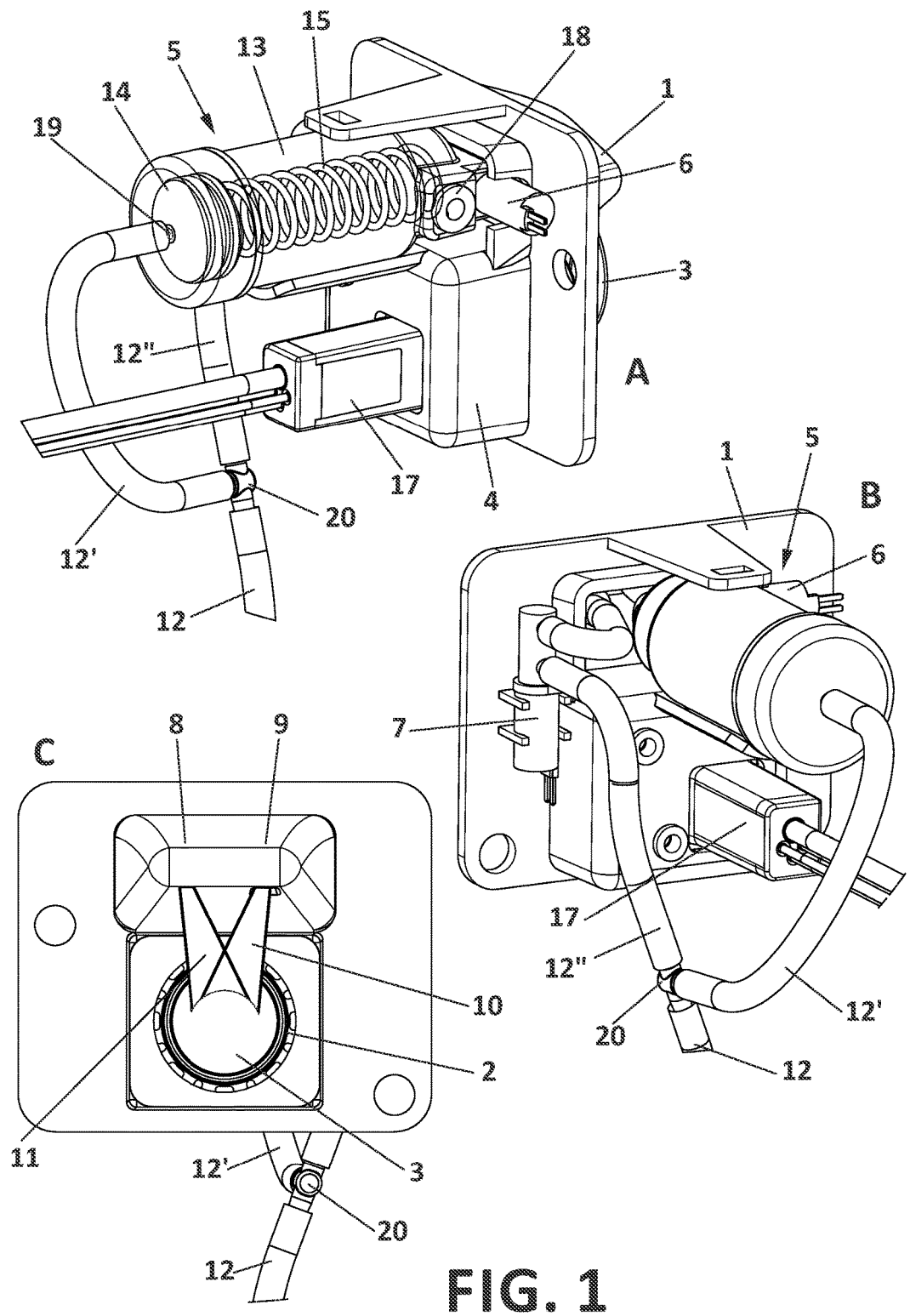
FIG. 1.—shows a preferred embodiment of a part of the cleaning system according to the invention, wherein drawing a) is a perspective view with the air pump in broken lines to show the internal elements thereof, drawing b) is another perspective view, and drawing c) is a front elevational view.

FIG. 1 shows a support (1), preferably made of a plastic material, suitable to be fitted in an automobile surface. The support (1) has an opening (2) and an optic surface, a camera lens (3) in this example, mounted at that opening (2), and a video camera (not shown) inside a housing (4) of the support (1) and operatively arranged with respect to the camera lens (3). Additionally, an air pump (5), an air control device and a liquid control device, are also mounted in the support (1). Preferably, the air control device and the liquid control device, are implemented in this example, by means of first and second electrovalves (6, 7), respectively.

Alternatively, the camera lens (3) may consist of a glass cover provided to protect an optic lens placed behind the same.

A liquid nozzle (9) and an air nozzle (8) are mounted at an outer surface of the support (1) as shown in the figure, and they are arranged to respectively dispense washing liquid (10) and a blast of air (11) on the camera lens (3).

In an alternative embodiment, the support (1) includes a movable part (not shown), and the air nozzle and the liquid nozzle are mounted in that movable part, such that the movable part is configured to move from an operative position to a non-operative position, such that in the non-operative position the air and liquid nozzles are hidden inside the support.

The first electrovalve (6) is communicated with the air nozzle (8) and with the air pump (5) for opening and closing the flow of air provided by the air pump through the air nozzle (8). Similarly, the second electrovalve (7) is communicated with the liquid nozzle (9) and with a washing liquid conduit (12) for opening and closing the flow of washing liquid through the liquid nozzle (9).

An electric connector (17) is also coupled with the support for the electrical connection of the video camera or any other optic device with an external equipment (not shown).

The air pump (5) of the invention comprises a tubular body, a cylinder (13) in this example, and a displaceable plunger (14) housed inside the tubular body, such that a compression chamber (16) is defined by the cylinder (13) and the plunger (14). A spring coil (15) is housed within the compression chamber (16), such that the plunger (14) is biased by the spring coil (15) towards an air pump inlet opening (19).

The spring coil (15) is arranged to enlarge the volume of the compression chamber (16) after the air pump (5) has dispensed a blast of air. A one-way valve (18), mounted in the cylinder (13) and communicated with the compression chamber (16), is configured to allow air to enter into the compression chamber (16) during expansion of the compression chamber (16), and to prevent air from entering into the chamber during compression of the compression chamber (16). Preferably, this one-way valve (18) is made of an elastic material and has a conical shape, wherein its narrower end has an opening and it is placed inside the cylinder (13).

The washing liquid conduit (12) is additionally communicated with the air pump inlet opening (19), such that the air pump (5) can be operated by a flow of pressurized washing liquid supplied thereto. More in particular, the washing liquid conduit (12) is connected with a T-junction connector (20), and a first branch (12') of the conduit (12) is connected with the connector (20) and with the inlet opening (19) of the air pump, and a second branch (12") of the conduit (12) is connected with the connector (20) and with the first electrovalve (6), as shown in FIG. 1. In this way, a flow of pressurized washing liquid (21) generated by a liquid pump (22) is supplied both to the air pump (5) and to the second electrovalve (7).

Figure 2:
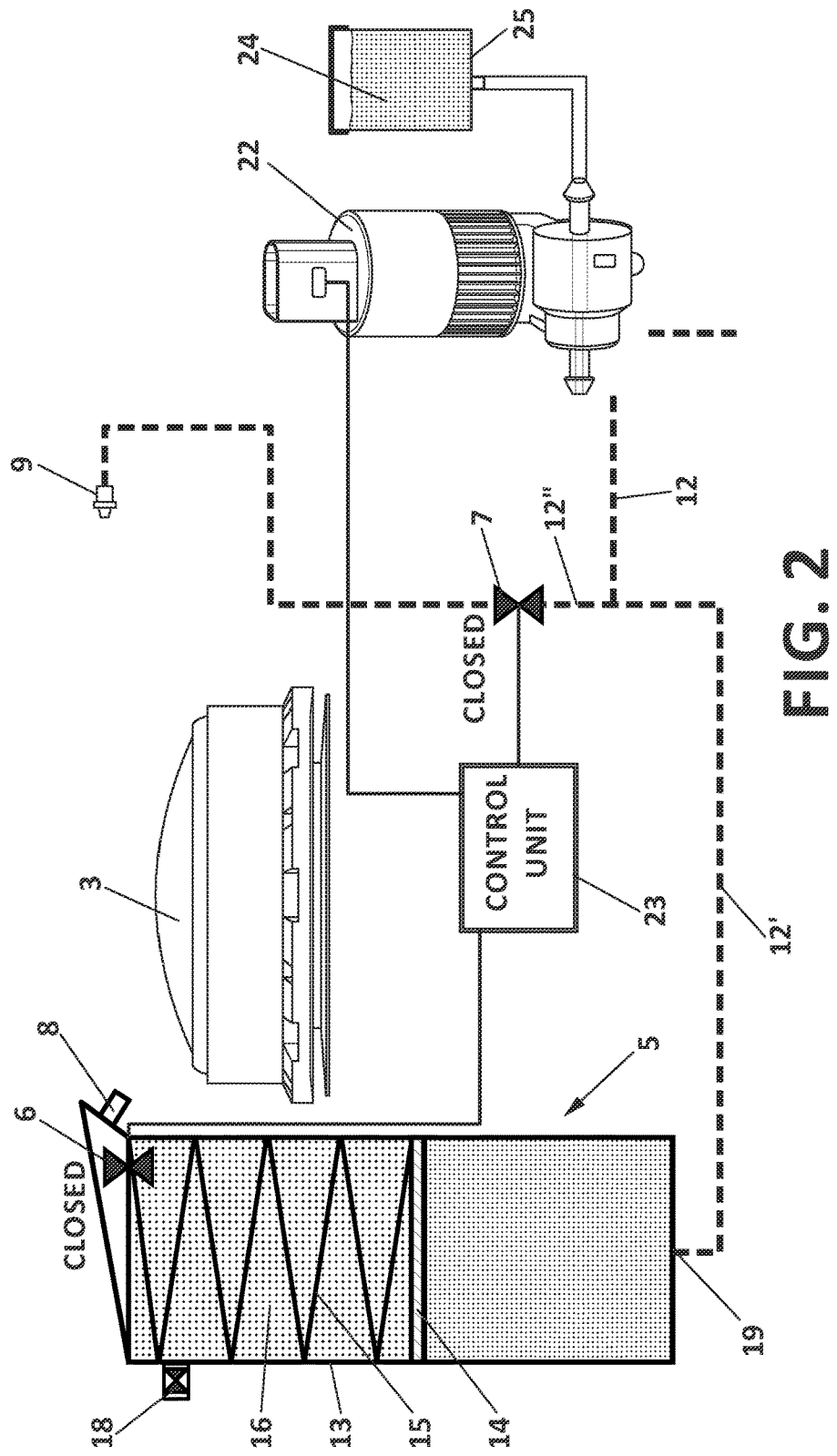
FIG. 2.—shows a schematic diagram of the cleaning system in an non-operative state.

FIGS. 2 to 5 illustrate in more detail the operation of the cleaning system and method of the invention. FIG. 2 represents the system in a non-operative state, wherein first and second electrovalves (6, 7) are closed and the liquid pump (22) is not supplying liquid to the cleaning system.

Figure 3:
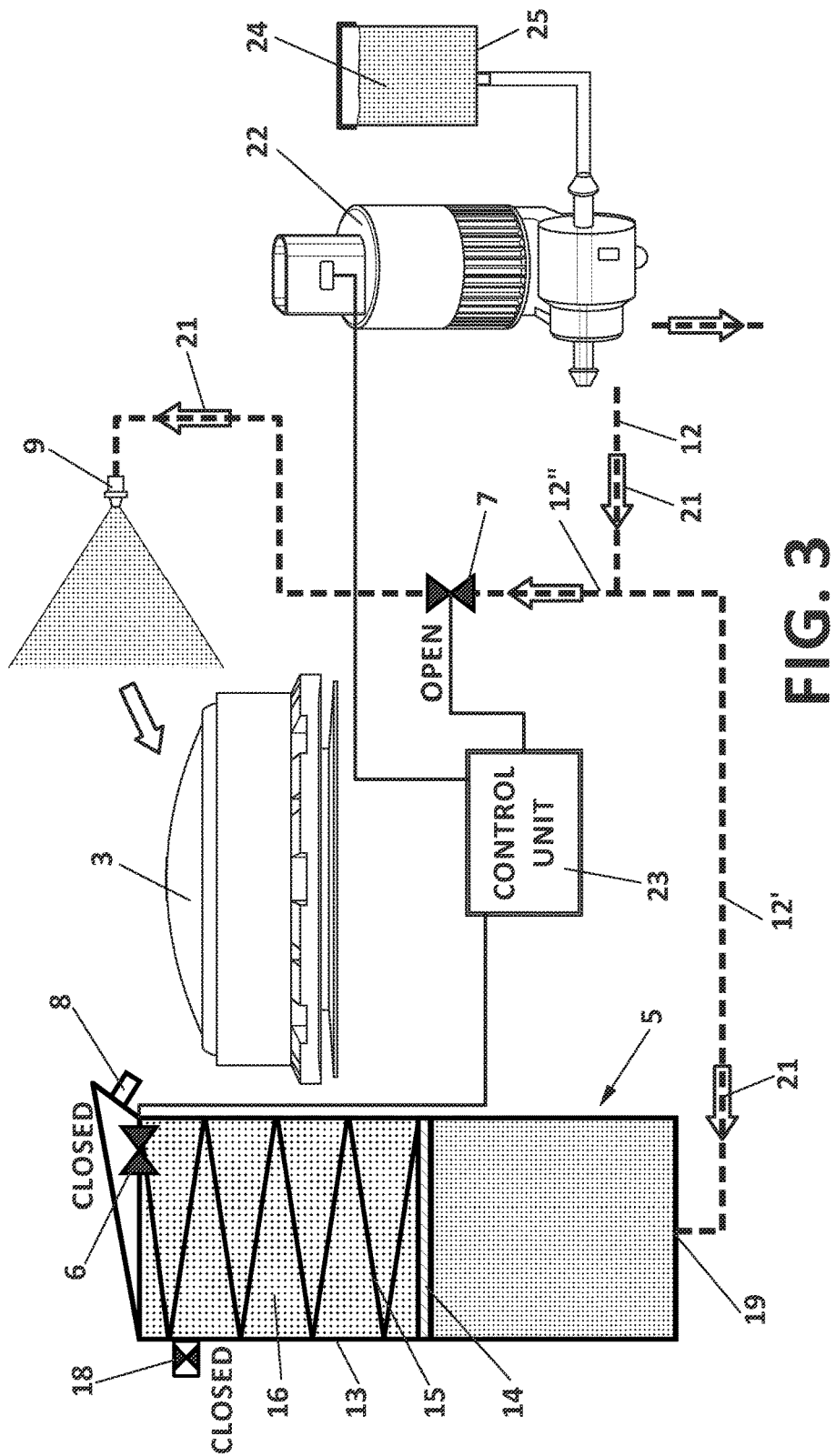
FIG. 3.—shows the diagram of FIG. 2 in a first stage of a cleaning process, wherein water and air flow are indicated by arrows.
Figure 4:
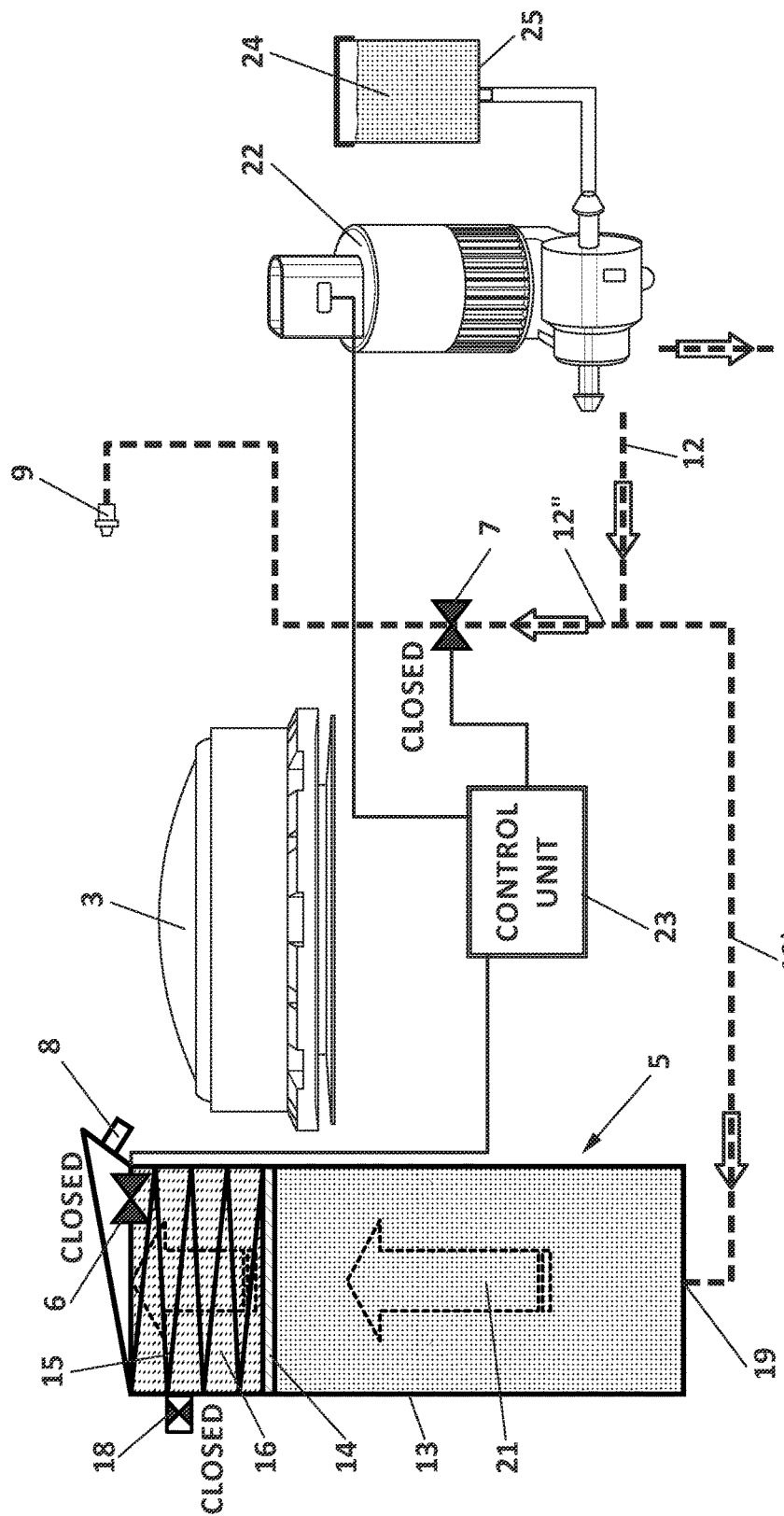
FIG. 4.—shows the diagram of FIG. 2 in a second stage of a cleaning process, wherein water and air flow are indicated by arrows.

As a vehicle user activates the cleaning system, a control unit (23) implemented by means of a programmable electronic device, electrically communicated with the first and second electrovalves (6,7) and the liquid pump (22), is adapted or programmed to carry out a cleaning cycle, in which first the liquid pump (22) is activated to pump washing liquid (24) from a washing liquid reservoir (25) to the washing liquid conduit (12) generating a flow of washing liquid (21). The second electrovalve (7) in this first stage of the cleaning cycle is open, so that a burst of washing liquid is dispensed through the liquid nozzle (9) on a camera lens surface (3) as shown in FIG. 3. At this stage the first electrovalve (6) remain closed, although the flow of washing liquid (21) is also fed to the inlet opening (19) of the air pump (5).

The burst (26) of washing liquid would clean the camera lens (3) surface, and some liquid drops may remain on that surface.

At a second stage of the cleaning cycle (FIG. 4), that is, after a predetermined period of time has elapsed, the control unit (23) closes the second valve (7) such that the circulation of pressurized washing liquid through the second branch (12") and the dispensing of the same is interrupted. However, at this situation the air pump (5) is filled with washing liquid whose pressure is applied to the plunger (14) which is thereby displaced against the elastic action of the spring (15) reducing the volume, that is, compressing the variable volume compression chamber (16) to pressurize a volume of air enclosed in that chamber, while the first electrovalve (6) remains closed. The one-way valve (18) remains closed at this stage due to the pressure within the compression chamber applied to the conical surface of that valve.

It can be appreciated that the cleaning system, and in particular the air pump (5) and the liquid pump (2) are adapted in such a manner that pressure of the washing liquid pumped by the liquid pump, overcomes the elastic force of the coil spring (15) to operate the air pump.

Figure 5:
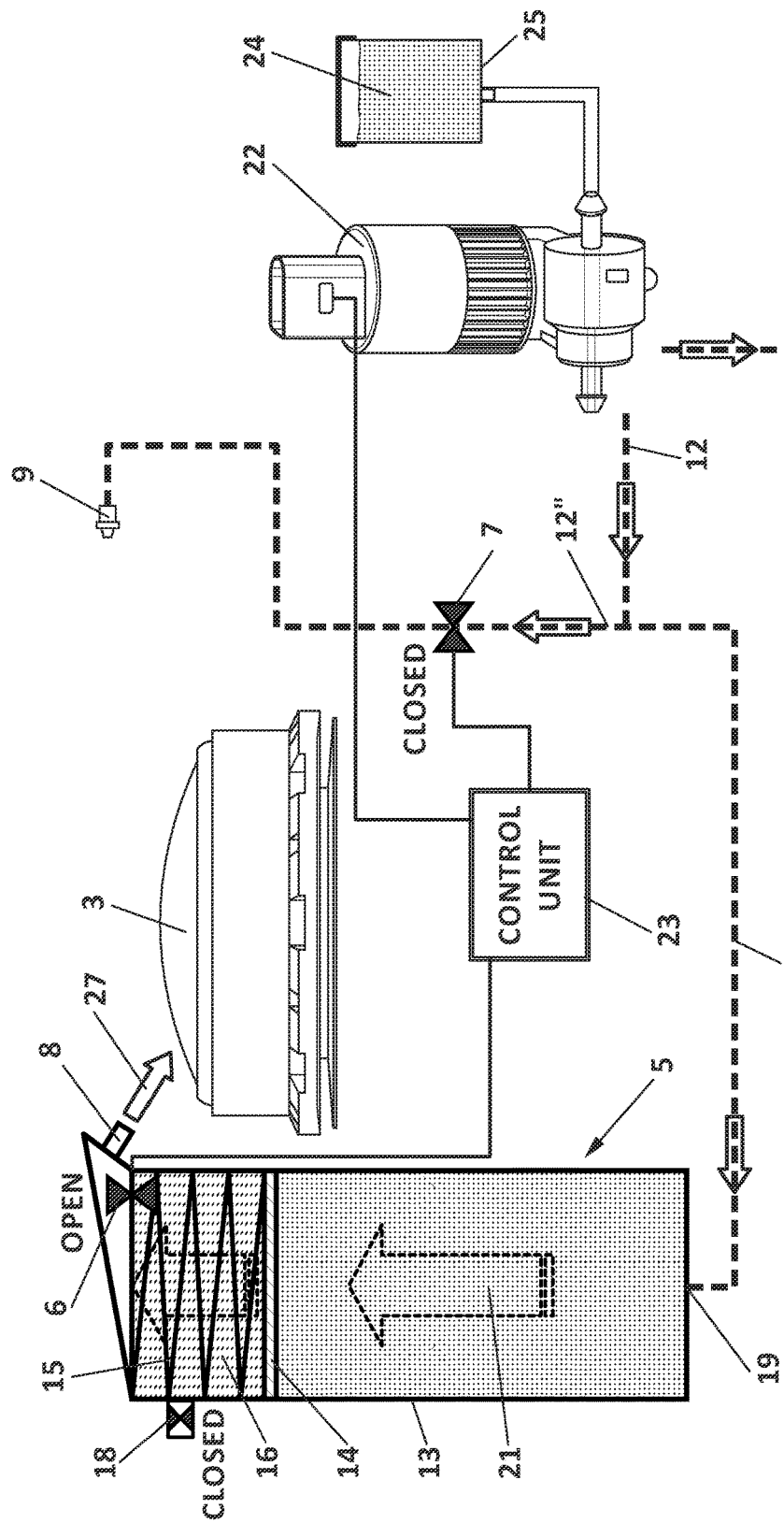
FIG. 5.—shows the diagram of FIG. 2 in a third stage of a cleaning process, wherein water and air flow are indicated by arrows.

Once a certain level of air pressure is reached, the control unit (23) then opens the first valve (6) so that the pressurized air is released through the air nozzle (8) and a blast of air (27) is projected on the camera lens (3) surface with enough pressure to remove and dry any liquid remaining on that surface. This process is depicted in FIG. 5.

Figure 6:
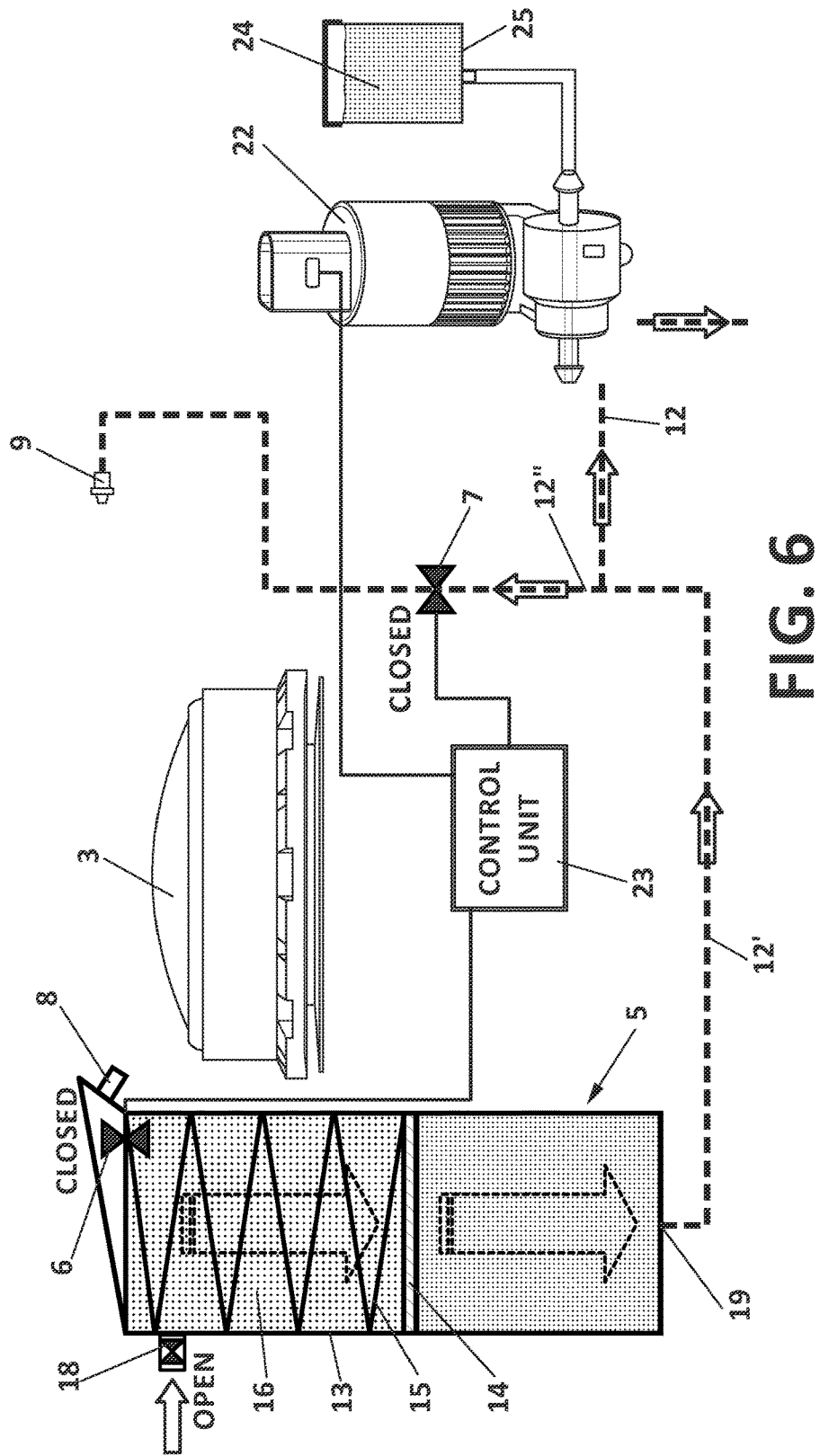
FIG. 6.—shows the diagram of FIG. 2 in a fourth stage of a cleaning process, wherein water and air flow are indicated by arrows.

After a determined period of time, the control unit (23) closes the first electrovalve (6) (FIG. 6) and stops the liquid pump (22) so that the hydraulic pressure on the plunger (14) is released. Then, the elastic force of the coil spring (15) overcomes the hydraulic pressure and forces the plunger (14) to return to its original position. At the same time that the compression chamber (16) expands, air from the exterior of the air pump is suctioned through the one-way valve (18) filling the compression chamber (16) with non-compressed air.

Figure 7:
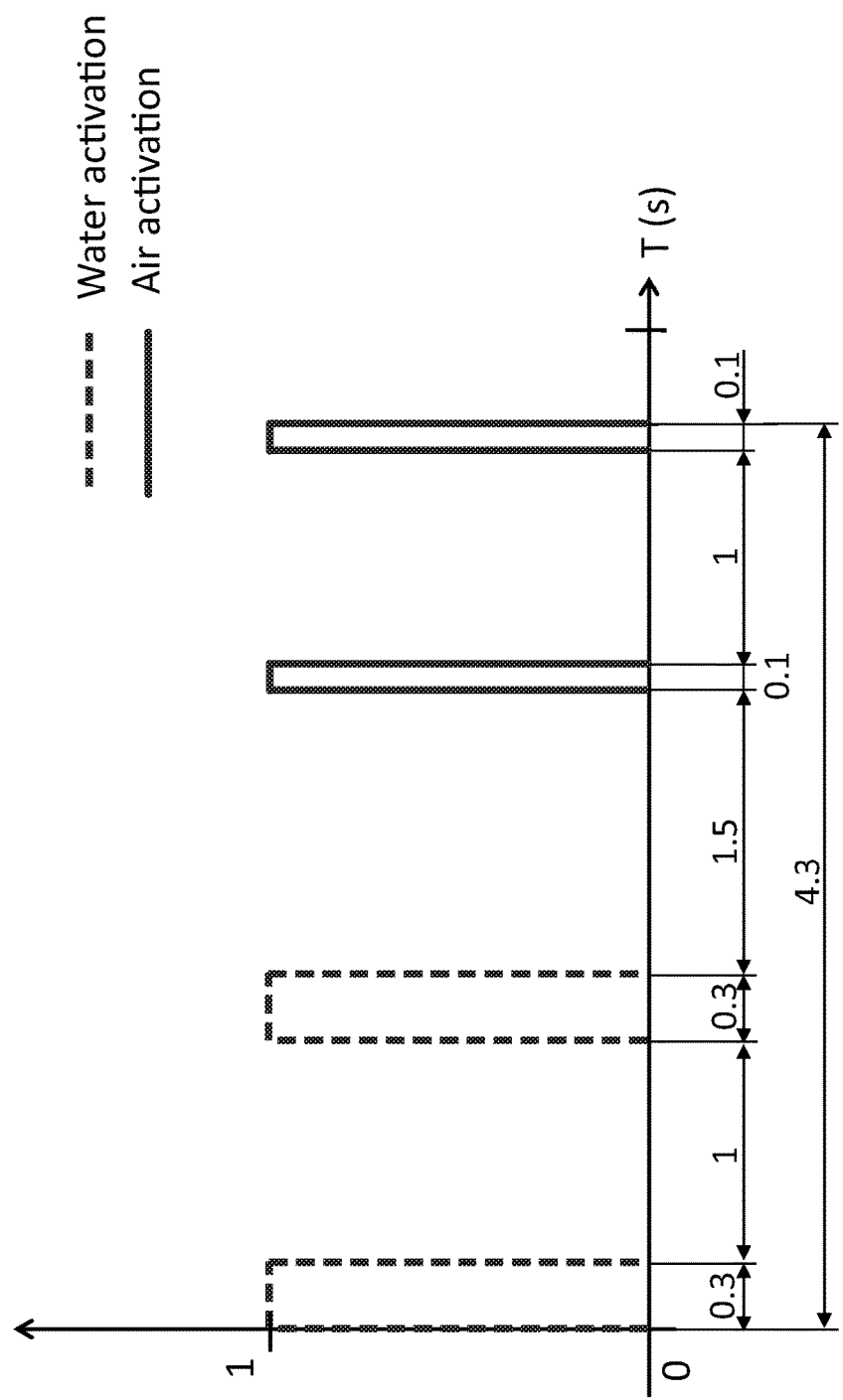
FIG. 7.—is a graph representative of the washing liquid and air activation sequence according to an exemplary embodiment of the invention. The units of time are given in seconds (s).

Several cleaning sequences can be performed depending on the conditions of the optic lens to be cleaned. FIG. 7 is an example of a preferred cleaning sequence which can be implemented in the case of heavy dirt, such as dried mud or insects stuck on the lens surface. In the case of FIG. 7, the cleaning cycle includes at least two consecutive washing liquid discharges each liquid discharge having a duration within the range 0.1 to 0.5 s; in this case 0.3 s, and with time interval of 1 s between these two liquid discharges. After, 1.5 s, at least two consecutive blasts of air of 0.1 s, are dispensed with a time interval of 1 s. The duration of the complete cleaning sequence is 4.3 s.

The measured volume of liquid and air per unit of time measured in the cleaning cycle of FIG. 7, is shown in FIG. 8.

In other conditions like light dirt, less volume of liquid and air is needed, so that less number of discharges are dispensed and the duration of the same is shorter.

In another preferred embodiment of the invention, the control unit (23) can be programmed to operate the air nozzle (8) and liquid nozzle (9) to carry out different cleaning sequences. For example, the control unit (23) can be programmed to operate the air nozzle (8) and liquid nozzle (9) independently from each other, to dispense only one or more bursts of washing liquid or to dispense only one or more blasts of air, which can be done simply by opening and closing the corresponding electrovalve.

Other preferred embodiments of the present invention are described in the appended dependent claims and the multiple combinations thereof.

The invention claimed is:
1. System for cleaning a vehicle-mounted optic surface, comprising:

a washing liquid nozzle and a liquid flow control device communicated with the washing liquid nozzle for controlling the flow of liquid therethrough,
an air nozzle and an air flow control device communicated with the air nozzle for controlling the flow of air therethrough,
an air pump having an inlet opening and an outlet opening, wherein the outlet opening is communicated with the air flow control device,
a washing liquid conduit connected with the liquid flow control device,
wherein the air pump includes a variable volume compression chamber to pressurize a volume of air, said compression chamber being communicated with the outlet opening,
wherein the washing liquid conduit is additionally communicated with the air pump inlet opening, such that the air pump can be operated by a flow of pressurized washing liquid, and
wherein the system is configured such that air pressure builds up in the compression chamber while the air flow control device is closed and the air pump is operated by the flow of pressurized washing liquid, and
wherein the system is additionally configured to open the air flow control device once a predetermined level of air pressure is reached inside the compression chamber, to produce a blast of pressurized air on the optic surface.

2. System according to claim 1, wherein the air pump comprises a tubular body, and a displaceable plunger housed inside the tubular body, such that the compression chamber is defined by the tubular body and the plunger, and wherein the air pump additionally comprises a spring coil housed in the compression chamber, such that the plunger is biased by the spring coil towards the inlet opening.

3. System according to claim 1, further comprising a liquid pump communicated with the washing liquid conduit to supply a pressurized washing liquid to the liquid flow control device and to the air pump.

4. System according to claim 3, further comprising a washing liquid reservoir communicated with the liquid pump.

5. System according to claim 3, wherein the air pump and the liquid pump are adapted in such a manner that an air pump plunger is driven by a flow of pressurized washing liquid pumped by the liquid pump, to reduce the volume of the compression chamber and generate a volume of pressurized air.

6. System according to claim 3, further comprising a control unit operatively associated with the air flow control device, with the liquid flow control device and with the liquid pump for commanding their operation, and wherein the control unit is adapted to carry out at least one cleaning cycle.

7. System according to claim 6, wherein the control unit is adapted to carry out a cleaning cycle wherein first a predetermined amount of pressurized washing liquid is dispensed onto the optic surface by opening the liquid flow control device, and subsequently the air flow control device is opened such that pressurized air is applied onto the optic surface to blow off any drop of washing liquid from the optic surface.

8. System according to claim 6, wherein the air flow control device and the liquid flow control device are electrovalves, and wherein the control unit is an electronic programmable device.

9. System according to claim 1, further comprising a support having an opening and the optic surface is mounted at that opening, and wherein the liquid nozzle and the air nozzle are mounted in the support, and they are arranged to respectively dispense washing liquid and project an air flow onto the optic surface.

10. System according to claim 9, wherein the air pump, the air control device and the liquid control device are mounted in the support.

11. System according to claim 9, wherein part of the support is configured in the form of a housing, and wherein the system further comprises an optic sensor placed inside that housing and operatively arranged with respect to the optic surface.

12. System according to claim 1, wherein the air pump is provided with a one-way valve communicated with the compression chamber, the one-way valve being configured to allow air to enter into the compression chamber during expansion of the same, and to prevent air from entering into the chamber during compression of the same.

13. System according to claim 1, wherein the optic surface is an optic lens or a cover window.

14. System according to claim 1 wherein the air control device is an electro-valve, and it is arranged at least in part, inside the air pump.

15. The system according to claim 1, wherein the air flow control device comprises an electrovalve, and wherein the liquid flow control device comprises an electrovalve.

16. The system according to claim 15, wherein the system is configured to increase liquid pressure inside the air pump when the liquid flow control device is closed.

17. Method for cleaning a vehicle-mounted optic lens providing the system of claim 1; generating a flow of pressurized washing liquid and supplying this flow of pressurized washing liquid to the liquid flow control device, and to the compression chamber to generate a volume of pressurized air, and dispensing a burst of pressurized washing liquid and dispensing pressurized air onto the optic lens according to a pre-determined cleaning sequence.

* * * * *